July 18, 1939.  P. G. JACOBSON  2,166,662
ANTIBACKLASH DEVICE
Filed Feb. 21, 1938
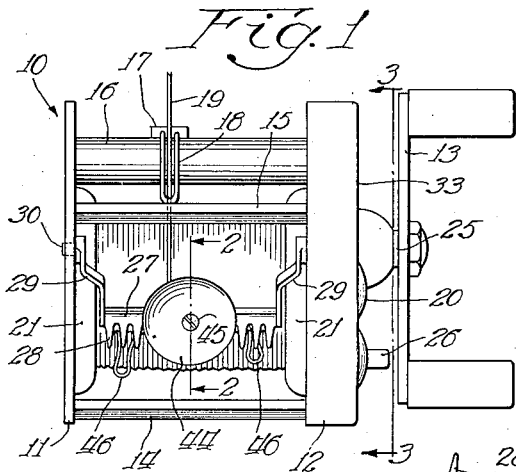
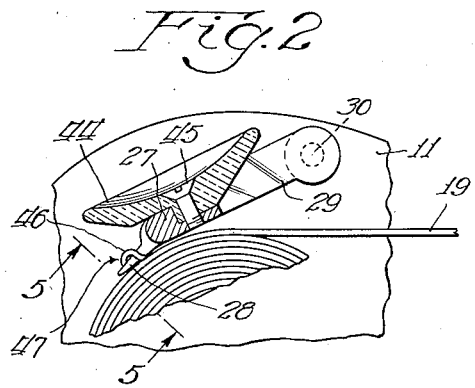
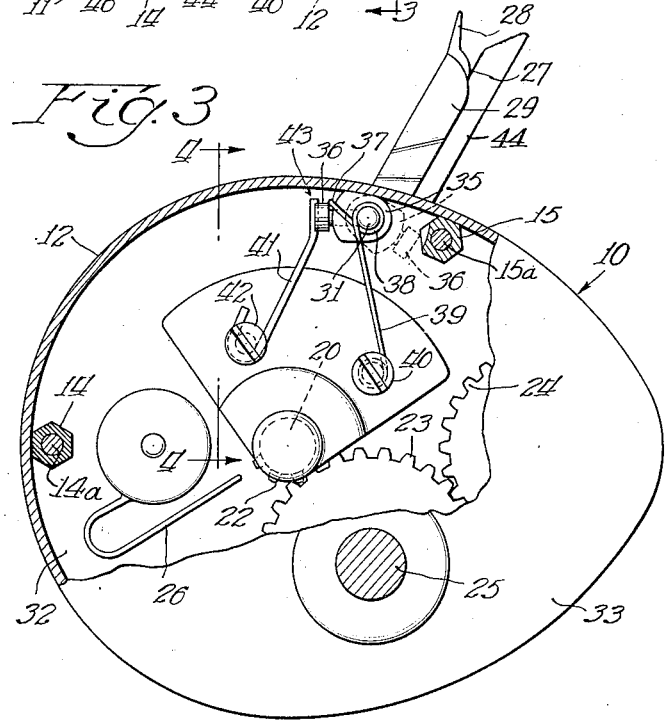
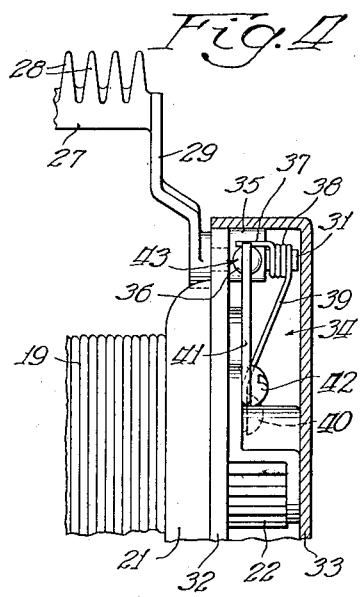
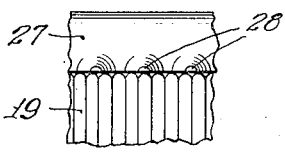
Inventor:
Peter G. Jacobson
By: A. Trevor Jones
Atty.

Patented July 18, 1939

2,166,662

UNITED STATES PATENT OFFICE 2,166,662

ANTIBACKLASH DEVICE

Peter G. Jacobson, Chicago, Ill.

Application February 21, 1938, Serial No. 191,607

5 Claims. (Cl. 242—84.5)

This invention relates to an anti-back-lash device for a fishing reel or the like, that is, a structure in which a reel is mounted on a frame or support for reeling inwardly and outwardly a fishing line such as a cord.

It is well known that one of the difficulties in the operation of such a mechanism is the occurrence of back-lash caused by the line slowing up in its movement so that the line is leaving the reel at a slower speed than the reel is rotating. Various devices have been proposed for slowing the speed of the reel when speed of outward movement of the line decreases, but none of these prior devices have been entirely successful in preventing excessive back-lash occurring to a point where the line becomes badly tangled on the reel.

The present invention aims to provide means for positively stopping forward movement of the line when such back-lash begins and before it has progressed far enough to cause a serious entanglement. Among other objects, the invention aims to provide simple and inexpensive means for this purpose which may be associated with present day fishing reel structures without disadvantage to the complete freedom of operation of the reel, according to approved practices.

Other objects and advantages will be apparent from the following description taken together with the accompanying drawing, in which—

Figure 1 is a plan view of a fishing reel embodying my invention;

Figure 2 is a partial cross-section, somewhat enlarged, taken on the line 2—2 of Fig. 1;

Figure 3 is a cross-section taken on the line 3—3 of Fig. 1, with the outer wall partially broken away for purposes of description, and with the parts in alternative position;

Figure 4 is a partial sectional view taken on the line 4—4 of Fig. 3; and

Figure 5 is a still further enlarged fragmentary view, taken somewhat on the line 5—5 of Fig. 2, but with the fish line shown in elevation.

Referring in detail to the illustrative construction shown in the drawing, 10 is a fishing reel having the frame side members 11 and 12, the double-spindle crank 13, and the cross bars 14, 15, and another (not shown) which is provided with a shield 16, this one being desirably in the form of a shaft (not shown) for a level-wind carriage 17 having the eye-piece 18 through which the line 19 is threaded. The ends of the cross-shafts 14, 15 receive threadedly therein the shank 14a, 15a of securing screws.

The reel proper includes a central shaft 20 provided with the end-pieces 21 which together with the shaft 20 form a spool-like member upon which the line 19 is wound or reeled, and which rotates in the frame 10 for this purpose either to move inwardly or in a winding-up direction on the reel or to permit movement of the line outwardly or in an unwinding direction upon the reel. A suitable gear train such as 22, 23, 24 transmits the motion of the crank shaft 25 to the reel shaft 20. The usual click mechanism 26 may be provided. The reel also has customary mounting means (not shown) for attaching the reel to a conventional rod or the like.

In accordance with the present invention, associated with the reel is an anti-back-lash device here represented by the comb 27 having the individual tines 28. As here shown, at each end of the comb there is a pivot arm 29, the outer end of which is fixedly secured to the comb 27, which is of about the length of the distance between the flanged members 21 of the reel shaft 20. The inner ends of the arms 29 are laterally offset to be pivoted on the pivot pins 30 and 31 carried by the frame members 11 and 12 respectively.

The frame member 12 is of a composite character, having the inner wall 32 and outer wall 33, which latter is cup-shaped to form the enclosure 34 which houses the gear train and click mechanism as well as mechanism for resiliently controlling the pivoted action of the comb 27. For this purpose, in this instance, the pivot pin 31 is of sufficient length to extend across the enclosure 34, and has a collar 35 suitably secured rigid with the pivot pin 31 within the enclosure 34. This collar carries a button 36 which may be in the form of a screw upon which is tensionally anchored one end 37 of a torsion spring 38 which is carried on the pin 31 and the other end 39 of which is anchored to a screw 40. The spring 38 tends to hold the comb 27 resiliently against the reel and normally against the line 19 wound on the reel.

In order that the comb may be held in an alternative position away from the reel, means are provided such as the leaf spring 41 anchored within the enclosure 34 on the screw 42, and adapted to be cammed on and off of the button 36 by swinging movement of the comb. That is, in the position of the comb shown in Figs. 3 and 4, the comb is releasably held away from the reel against the action of the spring 38 by reason of the stronger leaf spring 41 pressing as at 43 against the button 36. By rotating the comb downwardly the button 36 is released from the action of the spring 41 and the comb is restored to the influence of the spring 38.

The comb 27 desirably carries a thumb-pad 44 secured as by the screw 45 to the comb centrally thereof and upon which the thumb of the fisherman may rest during casting to increase or decrease the frictional pressure of the comb on the line, if desired, instead, as is now the practice, of the fisherman resting his thumb directly against the line. Thus, the pressure of the thumb may be exerted over the entire length of the reel upon which the line is wound, thereby enhancing the efficiency of this thumb operation.

If, now, the line when being cast should slow up in its outward movement while the reel by its momentum is still attempting to pay off the line within the reel at a faster speed than the line is moving away from the reel, there would occur the back-lash tendency common to fishing reels under such conditions, and if unchecked, the over-run of the reel would badly clog or tangle the line. Upon such an occurrence, if the fisherman is sufficiently expert in detecting this tendency, he may increase the pressure of his thumb upon the comb and thus minimize the back-lash effect, but frequently this occurs so rapidly that a bad entanglement might result in spite of the watchfulness of the user. Accordingly, my invention provides that the reel shall be positively stopped by engagement with the line itself. In other words, the moment the reel over-runs faster than the outward movement of the line, a loop 46 (of which there may be one or a plurality) is formed in the line, and wherever this occurs in the axial length of the reel and before the reel has completed an additional revolution, the loop is immediately caught or hooked upon one of the tines 28, for example as at 47, Fig. 2. It will be understood by those skilled in the art that the loop 46 will always be formed as a closed reverse loop spaced from the portion of the line immediately leaving the reel and with its bight extending in a direction opposite or reverse to out-running rotation of the reel. The reel thereupon is positively stopped from rotation in the direction of outward movement of the line, and therefore lengthening the loop or loops 46 is prevented. It will be understood that a bad entanglement cannot occur in the line unless the reel were permitted to continue over-running sufficiently to lengthen the loops 46 so that these loops would be entangled one with another.

As by the use of my invention, a loop 46 is caught by the comb before its length has become sufficiently great for it to entangle with another loop 46, if there be one, the advantageous result is that the fisherman at his leisure may manually retract the line by means of the usual crank 13 after the reel is stopped, so that the loop 46 is backed off the comb, and thereupon the comb may be manually placed in the inoperative position shown in Figs. 3 and 4. Then the fisherman may manually pull a sufficient amount of the line off from the reel to remove the loop or loops 46 and then restore the comb to its normal position held resiliently against the normally wound portion of the line on the reel. Thus, the tendency to back-lash having been nipped in its incipiency, the delay and inconvenience to the fisherman is minimized and casting may be immediately resumed.

In order that the tines 28 may have no tendency to cut the line, they are desirably formed somewhat in the shape of a longitudinal section of a cone, as best shown in Fig. 5, with their flat sides riding against the line and their curved sides engaging the line when a loop 46 is formed as described.

Such changes may be made as fall within the scope of the following claims without departing from the invention.

Having described my invention, I claim:

1. In a device of the class described, the combination of a reel, a line wound thereon, a frame on which the reel rotates, and means carried by the frame for hooking a reverse loop in the line for positively stopping rotation of the reel in the direction of outward movement of the line on the reel.

2. In a device of the class described, the combination of a reel, a line wound thereon, a frame on which the reel rotates, and means carried by the frame including a comb pivoted on the frame and having frictional engagement with the line, the tines of the comb facing in the direction of inward movement of the line on the reel.

3. In a device of the class described, the combination of a reel for a line to be wound thereon, a frame on which the reel rotates, and means carried by the frame including a comb pivoted on the frame and having frictional engagement with the line, the tines of the comb facing in the direction of inward movement of the line on the reel in which the comb is spring-pressed on the line.

4. In a device of the class described, the combination of a reel for a line to be wound thereon, a frame on which the reel rotates, and line-engaging means carried by the frame including a comb, the tines of the comb facing in the direction of inward movement of the line on the reel whereby a reverse loop formed in the line by back-lash will be engaged by one of said tines.

5. In a device of the class described, the combination of a reel for a line to be wound thereon, a frame on which the reel rotates, and means carried by the frame including a comb pivoted on the frame and having frictional engagement with the line, the tines of the comb facing in the direction of inward movement of the line on the reel and in which the comb includes a thumb-piece.

PETER G. JACOBSON.